Patented Dec. 19, 1922.

1,439,596

UNITED STATES PATENT OFFICE.

AUGUST W. ANNERT, OF JERSEY CITY, NEW JERSEY.

PLUMBER'S SOIL.

No Drawing.   Application filed April 17, 1922.   Serial No. 554,188.

*To all whom it may concern:*

Be it known that I, AUGUST W. ANNERT, a citizen of the United States, residing at Jersey City, in the county of Hudson and State of New Jersey, have invented certain new and useful Improvements in a Plumber's Soil; and I do hereby declare the following to be a full, clear, and exact description of the invention, such as will enable others skilled in the art to which it appertains to make and use the same.

This invention relates to a plumber's soil. It is aimed to provide a composition of this character which avoids the use of glue or equivalent adhesive so that it may be more readily prepared, or removed, will remain longer in a viscid or workable condition, can be agreeably handled, which is less expensive and which reduces the proportion of lampblack usually used in plumber's soil and which will be generally more effective and advantageous.

Another object is to provide a plumber's soil in which starch and a syrup are used in combination to impart the viscid consistency thereto and with the starch further fuctioning to reduce the proportion in which the lampblack must be employed.

In carrying out the invention, lampblack, starch and a syrup, preferably molasses, are used. These ingredients in any suitable proportions, are mixed together intimately so as to form a viscid composition. In this raw state the composition may be used. However, it may also be boiled, steamed or heated, if desired.

As one example, two parts of lampblack and one part of corn starch by volume are intimately mixed together while in a dry state and then mixed with sufficient molasses to reduce the mixture to the consistency of paste.

Said mixture is preferably thinned by means of water before use. For instance directly after compounding it, it may be diluted with water and placed in cans or containers for sale, so that the purchasers upon opening the cans or containers will find the composition ready for use. When it is sold in a paste state, sufficient water may be added thereto or the applying brush moistened and rubbed on the composition, so that the composition when actually applied will be of the proper or desired consistency.

In the using the composition, the pipes or other parts to be soldered together for instance by means of a wiped joint as is usual, have the composition applied thereto at a point beyond the area to receive the solder and to thus confine the area where the solder may adhere or join the pipes. The plumber's soil will prevent the solder of the wiped joint from adhering to the joint or other parts beyond the edges of the wiped joint so as to present a neat appearance or finish to the joint.

Attention is called to the fact that the composition is of such a nature that the application of heat incidental to the wiping of the joint, will not cause the composition to run or become displaced.

The composition prepared in accordance with my invention will remain in a viscid state and without spoiling for a considerable period of time and it may be readily prepared, not necessarily requiring heat as in the case of the melting of glue.

I find that the starch imparts an effective body to the molasses and in addition enables the composition to be prepared with the use of lampblack in a relatively small proportion.

As merely one example of the practice of the invention has been given, it is to be understood that changes may be resorted to provided they fall within the spirit and scope of the invention.

I claim as my invention:—

1. Plumber's soil including lampblack and having syrup as the viscid agent therein.

2. Plumber's soil having lampblack and molasses therein.

3. Plumber's soil having lampblack, starch and a syrup therein.

In testimony whereof I affix my signature in presence of two witnesses.

AUGUST W. ANNERT.

Witnesses:
EDWARD J. NEITZEL,
WILLIAM HEITMAN.